United States Patent [19]
Caren et al.

[11] Patent Number: 6,029,442
[45] Date of Patent: *Feb. 29, 2000

[54] METHOD AND APPARATUS FOR USING FREE RADICALS TO REDUCE POLLUTANTS IN THE EXHAUST GASES FROM THE COMBUSTION OF FUEL

[75] Inventors: Robert P. Caren, Westlake Village; Leon Ekchian, Northridge, both of Calif.; Jack A. Ekchian, Belmont, Mass.

[73] Assignee: Litex, Inc., Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,287

[22] Filed: Oct. 7, 1997

Related U.S. Application Data

[63] Continuation-in-part of application No. 08/768,833, Dec. 18, 1996.

[51] Int. Cl.[7] .................................................. F01N 3/00
[52] U.S. Cl. .................... 60/275; 60/274; 60/287; 60/299; 204/168; 204/173; 204/179
[58] Field of Search .............. 60/274, 275, 276, 60/301, 303, 304, 287, 288, 308, 299; 123/536, 539; 422/168, 169, 186.04; 204/168, 173, 179

[56] References Cited

U.S. PATENT DOCUMENTS

| | | | |
|---|---|---|---|
| 1,333,836 | 3/1920 | Csanyi . | |
| 1,725,661 | 8/1929 | McPartland . | |
| 1,982,484 | 11/1934 | Runge | 123/119 |
| 3,188,167 | 6/1965 | Specht | 23/2 |
| 3,896,616 | 7/1975 | Keith et al. | 60/274 |
| 3,979,193 | 9/1976 | Sikich | 55/123 |
| 4,041,922 | 8/1977 | Abe et al. | 123/191 |

(List continued on next page.)

FOREIGN PATENT DOCUMENTS

| | | | |
|---|---|---|---|
| 5332128 | 12/1993 | Japan | 3/20 |
| WO 98/09699 | 3/1998 | WIPO . | |

OTHER PUBLICATIONS

Rogers et al., "The Removal of Nitric Oxide using a Non–Thermal Plasma Discharge Device", http://www.gnt.nct/~rogersjw/nox/nox.htm1.

Southwest Research Institute (SwRI) News release, 1996, "SwRI nonthermal plasma reactor neutralizes harmful emissions", http://www.swri.org/9what/releases/plasma.htm.

Kintaichi et al., "Selective Reduction of Nitrogen Oxides with Hydrocarbons Over Solid Acid Catalysts in Oxygen–Rich Atmospheres," Catalysis Letters 6 (1990) 239–244.

Yasuda et al., "IR Study of Catalytic Reduction of Nitrogen Monoxide by Propene in the Presence of Oxygen over Ce–Exchanged ZSM–5 Zeolite," Symposium on $NO_x$ Reduction Presented before the Division of Petroleum Chemistry, Inc. 207th National Meeting, American Chemical Society, San Diego, CA, Mar. 13–18, 1994, 99–102.

(List continued on next page.)

Primary Examiner—Edward K. Look
Assistant Examiner—Binh Tran
Attorney, Agent, or Firm—Pennie & Edmonds LLP

[57] ABSTRACT

The invention is directed to an apparatus and a method for the reduction of pollutants in the exhaust stream of a combustion engine. Radicals are produced using a corona discharge in the combustion gas stream of the engine, either in the precombustion gas stream or from water in the exhaust gas. When the radicals are produced from the exhaust gas stream, the radicals may be produced using a corona discharge placed directly in the exhaust stream leading to the catalytic convertor, or a portion of the exhaust stream may be diverted to a remote corona discharge radical generator. The corona discharge in the generator produces radicals in the diverted exhaust gas, and the exhaust gas containing radicals is then conveyed to the exhaust gas stream at a point upstream of the catalytic convertor.

73 Claims, 5 Drawing Sheets

U.S. PATENT DOCUMENTS

| | | |
|---|---|---|
| 4,309,199 | 1/1982 | Suzuki .................................... 55/127 |
| 4,434,771 | 3/1984 | Slmnicki ................................ 123/539 |
| 4,519,357 | 5/1985 | McAllister ............................. 123/539 |
| 4,945,721 | 8/1990 | Cornwell et al. ........................ 60/274 |
| 4,968,396 | 11/1990 | Harvey .................................... 204/131 |
| 5,097,665 | 3/1992 | Kammel ................................... 60/275 |
| 5,154,807 | 10/1992 | Harvey .................................... 204/131 |
| 5,284,556 | 2/1994 | Rich ........................................ 204/164 |
| 5,410,871 | 5/1995 | Masters et al. . |
| 5,419,123 | 5/1995 | Masters . |
| 5,433,832 | 7/1995 | Rich et al. .............................. 204/164 |
| 5,474,747 | 12/1995 | Hayashi et al. ......................... 422/177 |
| 5,487,874 | 1/1996 | Gibboney, Jr. ..................... 422/186.03 |
| 5,623,819 | 4/1997 | Bowker et al. ......................... 60/39.06 |
| 5,655,210 | 8/1997 | Gregoire et al. . |
| 5,711,147 | 1/1998 | Vogtlin et al. . |
| 5,746,984 | 5/1998 | Hoard ..................................... 422/169 |
| 5,771,683 | 6/1998 | Webb ....................................... 60/274 |
| 5,891,409 | 4/1999 | Hsiao et al. . |
| 5,893,267 | 4/1999 | Vogtlin et al. . |

OTHER PUBLICATIONS

Liu et al., "In Situ XANES Characterization of Cu in Cu–ZSM–5 during Selective Catalytic Reduction of NO by Hydrocarbon," Symposium on $NO_x$ Reduction Presented before the Divison of Petroleum Chemistry, Inc. 207th National Meeting, American Chemical Society, San Diego, CA, Mar. 13–18, 1994, 107–111.

Burch et al., "Mechanism of the Selective Reduction of Nitric Oxide by Propene on Platinum–Based Catalysts in the Presence of Excess Oxygen," Symposium on $NO_x$ Reduction before the Division of Petroleum Chemistry, Inc. 207th National Meeting, American Chemical Society, San Diego, CA, Mar. 13–18, 1994, 150–153.

Hamada et al., "Transition metal–promoted silica and alumina catalysts for the selective reduction of nitrogen monoxide with propane," Applied Catalysis, 70 (1991) L1–L8.

Hamada et al., "Selective reduction of nitrogen monoxide with propane over alumina and HZSM–5 zeolite," "Effect of oxygen and nitrogen dioxide intermediate," Applied Catalysis, 70 (1991) L15–L20.

Suhr et al., "Reduction of Nitric Oxide in Flue Gases by Point to Plane Corona Discharge with Catalytical Coatings on the Plane Electrode," Combust. Sci. and Tech., vol. 72. pp. 101–115.

Penetrante et al., "Comparsion of Electrical Discharge Techniques for Nonthermal Plasma Processing of NO in $N_2$," IEEE Transaction on Plasma Science, vol. 23, No. 4, Aug. 1995, 679–687.

Whealton et al., "971718 Non–Thermal Plasma Exhaust Aftertreatment: A Fast Rise–Time Concept," Manuscript based on work performed at the Oak Ridge national Laboratory, managed by Lockheed Martin Energy Research Corporation for the U.S. Dept. of Energy under contract number DE–AC05–96OR22464, 1–14.

Fanick et al., "Stimultaneous Reduction of Diesel Particulate and $NO_x$ Using a Plasma," SAE Technical Paper Series 942070, 239–246.

Hepburn et al., "The Pulse Flame Combustor Revisited," 962118 Ford Motor Co., 1–36.

Sztenderowicz et al., of Chevron Research and Technology Co. et al., "Effects of Fuel Sulfur Level on Emissions from Transitional Low Emission Vehicles," 952561, 2067–2082.

*Plasma Exhaust Aftertreatment,* SAE SP–98/1395, Library of Congress Catalog Card Number: 98–86679, Copyright ©1998 Society of Automotive Engineers, Inc.

METHOD AND APPARATUS FOR USING FREE RADICALS TO REDUCE POLLUTANTS IN THE EXHAUST GASES FROM THE COMBUSTION OF FUEL

CROSS-REFERENCE TO RELATED APPLICATIONS

The present application is a continuation-in-part of U.S. application Ser. No. 08/768,833, filed Dec. 18, 1996.

FIELD OF THE INVENTION

The present invention is directed to a method and apparatus for reducing pollutants in the exhaust gases produced by the combustion of fuels. More particularly, the invention is directed to a method and apparatus where the reduction in pollutants is achieved by producing highly oxidizing free radicals, such as hydroxyl radicals, OH, hydroperoxyl radicals, $HO_2$, atomic hydrogen, H, and atomic oxygen, O, and related oxidizing gaseous species, such as hydrogen peroxide, $H_2O_2$, nitrogen dioxide, $NO_2$, and ozone, $O_3$, by a corona discharge from water vapor and residual oxygen in the exhaust gases, and introducing these radicals into the combustion gas stream of or at a combustion engine upstream of or at a catalytic convertor.

BACKGROUND OF THE INVENTION

As is well-known in the art, an internal combustion engine draws in ambient air, mixes the air with fuel, and introduces the mixture of air and fuel into a combustion chamber, where the mixture of air and fuel is ignited and burned. The resulting exhaust gases, which may be treated to remove pollutants, are then expelled into the atmosphere. Ignition of the air/fuel mixture in the cylinder is typically achieved by an ignition device, typically, a spark plug or the like, or by the adiabatic compression of the air/fuel mixture, which heats the mixture to a temperature above its ignition point.

In gasoline powered internal combustion engines commonly in use today, ambient air is conveyed via an air intake duct or port to a carburetor or a fuel injection system, which is used to mix the air with the fuel to create the air/fuel mixture. For engines with some types of fuel injection systems, as well as those equipped with carburetors, the air/fuel mixture is then conveyed via an intake manifold to the combustion chamber or cylinder of the engine. In gasoline engines equipped with port injection type fuel injection systems, the air is directed through the intake manifold to the intake port of the combustion chamber before the fuel is mixed with the air. In diesel-type engines and some gasoline engines using fuel-injection systems, the air and fuel are conveyed separately to the combustion chamber or cylinder of the engine where they are mixed.

After the combustion of the air/fuel mixture, the resulting exhaust gases are expelled from the combustion chamber to an exhaust manifold. In almost all modern gasoline powered automobiles, the exhaust gases are then conveyed by an exhaust pipe to a catalytic converter where pollutants are substantially removed from the exhaust gas. However, during the operation of an internal combustion engine, even one equipped with pollution control devices, such as a catalytic convertor, some pollutants, as described below, remain in the exhaust stream, and are expelled into the atmosphere.

In addition to complete combustion products, such as carbon dioxide ($CO_2$) and water ($H_2O$), internal combustion engines also produce exhaust gases containing a number of pollutants, e.g., carbon monoxide (CO), a direct poison to human life, and hydrocarbons (HC), that result from incomplete combustion. Also, due to the very high temperatures produced by the burning of the hydrocarbon fuels followed by rapid cooling, thermal fixation of nitrogen in the air results in the detrimental formation of nitrogen oxides ($NO_x$), an additional pollutant.

The amount of CO, HC, $NO_x$ and other pollutants produced by an internal combustion engine varies with the design and operating conditions of the engine and the fuel and air used. In particular, the amount of CO, HC, and $NO_x$ pollutants is determined in part by the air-to-fuel ratio, such that conditions conducive to reducing carbon monoxide and hydrocarbons, i.e., a fuel mixture just lean of stoichiometric, which results in higher combustion temperatures, causes an increase in the formation of $No_x$, and conditions conducive to reducing the formation of $NO_x$, i.e., fuel rich or fuel lean mixtures, which results in lower combustion temperatures, causes an increase in carbon monoxide and hydrocarbons in the exhaust gases of the engine.

Although the presence of pollutants in the exhaust gases of internal combustion engines has been recognized since 1901, the control of internal combustion engine emissions in the United States only became required by law with the passage of the 1970 Clean Air Act. Engine manufacturers have explored a wide variety of technologies to meet the requirements of this Act, including exhaust gas recirculation, electronically controlled fuel injection systems, which receive data from various sensors in the combustion stream, allowing the accurate control of the air/fuel ratio, and catalytic convertors. Catalysis has proven to be the most effective passive system.

The purpose of a catalytic convertor is to oxidize CO and HC to $CO_2$ and $H_2O$, and, in a three way catalyst, to reduce $NO/NO_2$ to $N_2$. In modern three way catalytic converters (TWC) in which all three pollutants are reduced simultaneously, $NO_x$ reduction is most effective in the absence of oxygen, while the abatement of CO and HC requires oxygen. Therefore, the prevention of the production of these emissions requires the operation of the engine at or near the stoichiometric air-to-fuel ratio.

Today, nearly all automobile catalytic converters are noble metals, held in honeycomb monolithic structures, which have excellent strength and crack-resistance under thermal shock. The honeycomb construction and the geometries chosen provide a relatively low pressure drop and a large total surface area that enhances the mass transfer controlled reactions that remove pollutants from the exhaust. The honeycomb is set in a steel container, and protected from vibration by a resilient matting.

An adherent washcoat, generally made of stabilized gamma alumina into which the catalytic components are incorporated, is deposited on the walls of the honeycomb. TWC technology for simultaneously converting all three pollutants typically utilizes the precious or noble metals platinum (Pt) and rhodium (Rh), where the Rh is most responsible for the reduction of $NO_x$, while also contributing to CO oxidation, which is primarily performed by Pt. Recently palladium, Pd, which is less expensive, has been substituted for or used in combination with Pt and Rh. The active catalyst generally comprises about 0.1 to 0.15% of these metals.

Because the exhaust gases of the combustion engine oscillate from slightly rich to slightly lean, an oxygen storage medium is added to the washcoat to adsorb oxygen onto the surface of the washcoat during any lean portion of the cycle, and release the oxygen for reaction with excess CO and HC during any rich portion of the cycle. Cerium Oxide ($CeO_2$) is most frequently used for this purpose due to its desirable reduction-oxidation response.

The passage of the 1990 Amendment to the Clean Air Act requires significant further reductions in the amount of pollutants being released into the atmosphere by internal combustion engines. In order to comply with these requirements, restrictions on the use of automobiles and trucks have been proposed, such as, employer-compelled car pooling, HOV lanes, increased use of mass transit as well as rail lines and similar actions limiting automobile and truck usage at considerable cost and inconvenience.

An alternative to diminished automobile and truck usage is decreasing emissions by increasing the efficiency of the internal combustion engine. This approach will have limited impact since studies show that most of automobile-originated pollution is contributed by only a small fraction of the vehicles on the road, these vehicles typically being older models having relatively inefficient engines and aging catalytic converters which inherently produce a lot of pollution. Any technological improvements to the total combustion process will not be implemented on these older vehicles if they require extensive or expensive modification to the engine or vehicle.

In addition, while considerable gains have been made in recent years to reduce the amount of pollutants in the exhaust gases of the internal combustion engine of vehicles such as automobiles and trucks, further reductions in the amount of pollutants in the exhaust gases of the internal combustion will be expensive, and presents a considerable technological challenge, since exhaust emissions of automobiles and trucks currently being manufactured do not meet proposed Environmental Protection Agency standards.

In lieu of decreasing exhaust emissions by increasing the efficiency of the internal combustion engine or decreasing the use of automobiles, a further alternative would be to increase the efficiency of the catalytic converter or catalysis. The conversion efficiency of a catalytic converter is measured by the ratio of the rate of mass removal of the particular constituent of interest to the mass flow rate of that constituent into the catalytic converter. The conversion efficiency of a catalytic converter is a function of many parameters including aging, temperature, stoichiometry, the presence of any catalyst poisons, such as lead, sulfur, carbon and phosphorous, the type of catalyst, and the amount of time the exhaust gases reside in the catalytic converter.

Prior art attempts to increase the efficiency of catalytic converters have not been sufficiently successful. Modern TWC catalytic converters help, but they are expensive, may have difficulty in meeting the future emission requirements, and have limitations in their performance lifetime. Catalytic converters also suffer from the disadvantage that their conversion efficiency is low until the system reaches operating temperature.

Therefore, a need exists for a simple, inexpensive means of reducing the amount of pollution released by internal combustion engines and catalyst combination that can be installed on engines that are presently in use, as well as newly manufactured engines. The present invention provides such a means.

SUMMARY OF THE INVENTION

One object of the present invention is to provide a method and apparatus for reducing pollutants in the exhaust gases of an internal combustion engine without the need for major modifications to the internal combustion engine or the catalytic converter.

Another object of the invention is to provide a method and apparatus, which are inexpensive to employ and manufacture, and simple in structure and operation, for reducing pollutants of incomplete combustion in the exhaust gases of a combustion engine.

The present invention is directed to an apparatus for reducing at least one pollutant in an exhaust stream of an engine, which comprises exhaust gas formed from the combustion of fuel, the engine having a combustion stream, which comprises a precombustion gas stream and an exhaust gas stream or postcombustion gas stream. The apparatus of the invention comprises a catalytic convertor, having an inlet and an outlet, and a corona discharge device for producing a corona discharge in the exhaust gas, such that radicals are produced from water or other gaseous species in the exhaust gas. The catalytic convertor is positioned such that at least a portion of the exhaust stream from the engine passes through the catalytic convertor, such that the radicals are introduced into the combustion gas stream, preferably the exhaust gas stream, at a point upstream of or at the inlet of or at the catalytic convertor. In one embodiment, however, the radicals are produced in the precombustion gas stream.

In an alternate embodiment, radicals are produced by the corona discharge device from water in the exhaust gas from the exhaust stream, and are introduced back into the exhaust stream at a point upstream of or at the inlet of or at the catalytic convertor. Typically, an exhaust pipe is attached to the inlet of the catalytic convertor, such that at least a portion of the exhaust stream passes through the exhaust pipe to and through the catalytic convertor, and the exhaust pipe comprises a fitting for positioning the corona discharge device in the exhaust stream, so that a corona discharge is produced in the exhaust stream upstream of or at the catalytic convertor.

Radicals may also be produced in exhaust gas in a remote corona discharge radical generator. In this embodiment, an exhaust pipe or manifold attached to the inlet or outlet of the catalytic convertor has an exhaust gas takeoff for conveying a portion of the exhaust stream to the remote radical generator. The corona discharge device in the generator is used to produce radicals, such as hydroxyl radical from water in the exhaust gas, in the portion of the exhaust stream conveyed to the remote radical generator. Exhaust gas containing radicals from the remote radical generator is then introduced into the exhaust stream at a point upstream of or at the catalytic convertor.

Preferably, in each embodiment described above, an oxygen sensor is positioned between the inlet of the catalytic convertor and the point upstream of or at the catalytic convertor where the exhaust gases containing radicals are introduced, either by in situ generation or addition, into the exhaust stream. Such an oxygen sensor is mounted upstream of the catalytic convertor in virtually all modern automobiles, and allows the fuel injection system of the engine to maintain a stoichiometric air/fuel ratio.

In another embodiment, the corona discharge device is positioned in a shunt attached to the exhaust pipe, such that at least a portion of the exhaust stream enters the shunt from the exhaust pipe at a first point upstream of the catalytic convertor, and re-enters the exhaust pipe at a second point upstream of or at the catalytic convertor. To reduce the operating temperature of the corona discharge device, the shunt may also comprise one or more extended surfaces or other cooling devices, which radiate or otherwise remove heat, and reduce the temperature of the shunt and the exhaust gas that passes through the shunt.

A typical corona discharge device comprises generally concentric electrodes, such that a corona discharge is formed in air gap between the electrodes when the device is operating. The concentric electrodes typically include an inner electrode, an outer electrode, which may be formed from a wire mesh, and a dielectric material, preferably having a dielectric constant in the range of from about 2 to about 10. The dielectric material forms a layer on at least one of the inner electrode or the inner surface of the outer electrode. The outer electrode may include a top portion, so that the air gap is totally enclosed by the electrodes and the dielectric, such that the outer electrode functions as a flame arrester. At least one flame arrester may also be positioned in the exhaust pipe to prevent the propagation of flame in the exhaust pipe; e.g., downstream of the corona discharge device and upstream of the catalytic convertor to prevent exposure of the catalytic convertor to flame from the combustion of residual fuel. A corona discharge device may also be used in which the exhaust pipe functions as a distant ground electrode for the corona discharge device.

To insure that fresh exhaust gases from the exhaust stream are constantly exposed to the corona, the corona discharge device may be positioned such that naturally occurring pressure fluctuations in the exhaust stream provide a pumping action that forces exhaust gas into the corona discharge device, and scavenges gases containing radicals produced in the corona discharge from the corona discharge device. This pumping action may be augmented by comprising a properly sized plenum, positioned adjacent to the corona discharge device, in a manner that allows the exhaust gas to pass from the exhaust pipe, through the corona discharge, into the plenum, and back into the exhaust pipe.

The apparatus of the invention may further comprise a device for injecting air into the exhaust stream during fuel rich cold start operating conditions, such that the corona discharge causes the oxidation of fuel in the exhaust stream.

The present invention is also directed to a method for the reduction of at least one pollutant in an exhaust stream comprising exhaust gas formed from the combustion of fuel in an engine having an exhaust pipe attached to an inlet of a catalytic convertor. The method comprises passing the exhaust stream through the exhaust pipe and the catalytic convertor; forming radicals in at least a portion of the exhaust gas from the exhaust stream using a corona discharge; and introducing the radicals into the exhaust stream upstream of or at the catalytic convertor. The radicals are typically produced from at least one of water or residual $O_2$ in the exhaust gas. The radicals may then react with gaseous species in the exhaust stream to form gaseous oxidizing species, including other radicals. Radicals and gaseous oxidizing species produced in the corona discharge and by secondary reactions include OH, O, H, $HO_2$, $H_2O_2$, $NO_2$, or $O_3$. The radicals are formed in at least a portion of the exhaust stream, and introduced into the exhaust pipe at a point upstream of or at the catalytic convertor, or a portion of or at the exhaust gas may be diverted from the exhaust stream, and conveyed to a remote radical generator, where radicals are formed in a corona discharge. The radicals are then introduced into the exhaust stream in the exhaust pipe at a point upstream of or at the catalytic convertor. In each embodiment, the oxygen sensor, if present, is preferably positioned in the exhaust pipe between the catalytic convertor and the point upstream of or at the catalytic convertor where the radicals are formed in the exhaust stream in the exhaust pipe.

Introducing radical into the exhaust gas stream upstream of or at the catalytic convertor has also been found to remove catalytic poisons from surfaces of the catalytic convertor by the reaction of the poisons with at least one of the radicals or gaseous oxidizing species formed from the reaction of radicals and gases in the exhaust stream. The catalytic poisons removed include compounds of sulfur, phosphorus, or carbon.

The corona discharge may also be used to initiate oxidation of residual fuel or hydrocarbons in the exhaust stream during cold start or misfire conditions, thereby reducing the amount of residual fuel and hydrocarbons before they reach the catalytic convertor. A controlled amount of air should be introduced into the exhaust stream during cold start conditions to provide the oxygen required for the combustion of the extra fuel in the exhaust.

In a further embodiment, the invention is directed to a method for improving the life and performance of an oxygen sensor, which is subject to poisoning by sulfur, phosphorus, and carbon, where the oxygen sensor is positioned in the exhaust stream upstream of a catalytic convertor. As in the case of the catalytic converter, the highly reactive radicals produced by the corona device can displace these poisons, thereby preserving the proper oxygen sensor function. The method comprises producing radicals in the combustion gas stream using a corona discharge, and introducing the radicals into the combustion gas stream upstream of the oxygen sensor. The radicals may be formed in the precombustion gas stream, or from water or residual oxygen in at least a portion of the exhaust gas from the exhaust stream. As described above, a portion of the exhaust gas from the exhaust stream may be diverted to a remote radical generator, where radicals are formed in the exhaust gas using a corona discharge. The radicals are then introduced into the exhaust stream at a point upstream of the oxygen sensor.

Corona discharge devices useful in the invention also include a compact corona discharge device, which comprises a first end or base, configured for attachment to a fitting in an exhaust system to allow exhaust gas from the exhaust system to enter into and exit from the corona discharge device, a second end, configured to prevent exhaust gas from leaking from the corona discharge device, preferably in the form of a metal cap, a generally cylindrical outer electrode, electrically and mechanically connected to the first end, an inner electrode, mounted concentric with, and partially surrounded by the outer electrode, and a dielectric insulator, mounted concentric with, and positioned between the inner and outer electrodes, forming an air gap between the electrodes, and having a diameter that defines the corona discharge device diameter, where the inner electrode has a length that is greater than that of the outer electrode to provide a corona region in the air gap near the first end and a ullage volume in the air gap near the second end. Preferably, each dimension of the corona discharge device is minimized, such that shunt resistive and capacitive power losses of the corona discharge are substantially minimized. Typically, the inner electrode has a length that is at least about twice, preferably 4 times, that of the outer electrode and at least about 4 times, preferably 6 times, that of the diameter of the compact corona discharge device defined by the dielectric insulator. A compact corona discharge device in accordance with the invention may further comprise an extended skirt section positioned between the base and the outer electrode to provide a lower temperature environment for the compact corona discharge device. To improve heat loss from the compact corona discharge device, the extended skirt preferably comprises at least one extended surface to radiate or otherwise remove heat, and cool the corona discharge device.

The compact corona discharge device may further comprise a orifice, which may be sonic, in the second end or cap to supply a controlled air flow through the compact discharge device for cooling. In this embodiment, the base of the compact corona discharge device is typically attached to a Venturi section in the exhaust system to provide a low pressure in the device to draw air through the sonic orifice.

DETAILED DESCRIPTION OF THE PREFERRED EMBODIMENTS

As used herein, the term "precombustion gas stream" refers to the flow of air or of the air/fuel mixture to the combustion chamber. The terms "postcombustion gas stream" and "exhaust gas stream", as used herein, refer to the resulting flow of exhaust gases from the combustion chamber following combustion of the air/fuel mixture. The precombustion and postcombustion gas streams are collectively referred to as the "combustion gas stream".

In addition, the terms "radical" or "radicals" and "free radical" or "free radicals" refer to any atom or group of atoms having at least one unpaired electron and no net electrical charge; i.e., as used herein, these terms refer to electrically neutral species having equal numbers of electrons and protons.

The present invention relates to a method and an apparatus for the reduction of the amount of pollutants, such as carbon monoxide (CO), hydrocarbons (HC), and oxides of nitrogen ($NO_x$), in the exhaust gas stream produced by the combustion of fuel. The method and apparatus of the invention are useful with internal combustion engines equipped with at least one catalytic convertor in the exhaust system. Preferably the method and apparatus of the invention are used with an internal combustion engine further comprising at least one oxygen sensor upstream of or at the catalytic convertor that allows the fuel injection system of the engine to maintain a stoichiometric air/fuel ratio. Such an oxygen sensor is mounted upstream of the catalytic convertor in virtually all modern automobiles. In the method of the invention, highly oxidizing free radicals, such as hydroxyl radicals, OH, hydroperoxyl radical, $HO_2$, atomic hydrogen, H, and atomic oxygen, O, and related oxidizing gaseous species, such as hydrogen peroxide, $H_2O_2$, nitrogen dioxide, $NO_2$, and ozone, $O_3$, are produced in or added into the combustion gas stream, preferably the exhaust gas stream, upstream of or at the catalytic convertor. The radicals and related gaseous oxidizing species enhance the oxidation of CO and HC to carbon dioxide ($CO_2$) and water ($H_2O$), and, to a lesser extent, the reduction of $NO_x$ to molecular nitrogen ($N_2$), so that, after passing through the catalytic convertor, the exhaust stream is substantially free of any material other than $CO_2$, $H_2O$, $N_2$, and possibly methane ($CH_4$).

In accordance with the invention, free radicals and related gaseous molecular oxidizers are introduced into the combustion gas stream of an engine to reduce pollutants and contaminants, such as CO and HC. In particular, it has been observed that hydroxyl radical, OH, can react rapidly with CO to produce $CO_2$. It has also been observed that OH in the presence of oxygen can react rapidly with hydrocarbons (HC) to produce formaldehyde or other similar intermediary products, which then further react with OH to form $H_2O$ and $CO_2$, and regenerate OH. Therefore, it appears that these reactions do not consume OH, but, instead, regenerate OH, so that OH acts as a homogeneous catalyst.

In the case of CO, the following reaction steps convert CO to $CO_2$ and regenerate OH:

$$CO + OH \rightarrow CO_2 + H$$
$$H + O_2 \rightarrow HO_2$$
$$HO_2 \rightarrow OH + O,$$

where the dissociation of hydroperoxyl to hydroxyl occurs by thermal decomposition in the exhaust stream.

In the case of HC, a simplified reaction set may described by the following steps:

$$HC + OH \rightarrow HCHO$$
$$HCHO + OH \rightarrow H_2O + HCO$$
$$HCO + O_2 \rightarrow CO_2 + OH.$$

Depending upon the HC species, there may be branching reactions and other free radical intermediaries and oxidizers, such as O, H, $NO_2$, $HO_2$ and $H_2O_2$, may be produced and either enter into the reactions directly or through the products of other reactions such as:

$$O + O_2 \rightarrow O_3, \text{ or}$$
$$H_2O_2 \rightarrow 2OH$$

Again, it is particularly important to note that OH is regenerated in the present invention in the course of the reactions, i.e., OH acts as a catalyst, and that the reaction sequence proceeds rapidly due to the nature of the free radical reactions.

It has been discovered that the presence of OH, as well as other free radical and gaseous molecular intermediates and oxidizers, such as O, H, $NO_2$, $H_2O_2$, $HO_2$, and $O_3$, in the exhaust gases of a combustion engine in the presence of the requisite oxygen, provides a highly effective catalytic conversion of CO and hydrocarbons to non-polluting gas species, i.e., $CO_2$ and water vapor. The OH and other related free radical and gaseous molecular oxidizers created by reaction of OH with gaseous species in the exhaust stream act as catalysts independent of or in conjunction with the normal catalytic function of the catalytic converter.

Thus, the invention employs radicals, such as hydroxyl radical and its associated reactive species, O, H, $NO_2$, $H_2O_2$, $HO_2$, and $O_3$, to provide a catalytic cycle for reducing CO and HC outputs of engines to meet present and future Ultra Low Emissions Vehicle "ULEV" and Low Emissions Vehicle "LEV" standards. Because the OH and other associated free radicals and gaseous molecular oxidizing species act as catalysts, relatively small amounts of radicals need to be injected for orders of magnitude more CO and hydrocarbons to be reduced to $CO_2$ and $H_2O$ in the presence of oxygen in the exhaust gas stream.

The introduction of or at radicals and related gaseous oxidizing species into the combustion gas stream upstream of the catalytic convertor results in the catalysis of the oxidation of CO and HC in the exhaust gas stream, and provides for the rapid removal of those pollutants. The catalytic conversion of CO to $CO_2$ and hydrocarbon to $CO_2$ and $H_2O$ by these oxidizing species occurs on the large washcoat surface in the catalytic converter, as well as in the gas phase in the exhaust stream. The conversion of CO and HC to $CO_2$ and $H_2O$ is substantially completed within a small region near the entrance of the catalytic converter, and, as a result, the bulk of the precious metal catalytic surface is freed from participating in these competing reactions. The converter's precious metal sites no longer need to play such a strong role in catalyzing the less reactive hydrocarbon species, such as methane, ethane, ethene, benzene and formaldehyde, and, as a result, the catalytic activity at the precious metal sites can be directed toward reduction of nitrogen oxides to nitrogen and other non-polluting gas species.

Because the catalytic action of the radicals and related gaseous oxidizing species, such as hydroxyl radical, occurs throughout the volume of the exhaust gas, as well as on the surface of the catalytic converter, the present invention is significantly more effective than a catalytic converter operating in the conventional manner in reducing the emission of pollutants. The introduction of these radicals for oxidizing gaseous species upstream of or at the catalytic convertor also significantly reduces the emission of nitrogen oxides below the level obtained with conventional methods because the precious metal sites are freed from the conversion of CO and HC, and, thus, also allows a reduction in the amount of precious metals in the catalytic convertor or the use of less costly metals or their oxides, while maintaining the reductions in $NO_x$ that are obtained with prior art methods.

In addition, it has been discovered that the generation of radicals and related gaseous oxidizing species by a corona discharge in the combustion gas stream, and their introduction into the exhaust stream upstream of or at the catalytic convertor, clean the catalytic convertor by reacting with and removing poisons on the surfaces of the catalytic convertor. Catalyst poisons that are removed by the oxidizing action of these free radicals and related gaseous oxidizing species include, but are not limited to, sulfur compounds, such as sulfates and sulfides of the noble metals in the catalyst, as well as SO and elemental sulfur, which may be bound to the surface forming a coating, phosphorous compounds, such as phosphides and phosphates of the noble metals, as well as $PO_2$, $P_2O_3$, and elemental phosphorous, which may also be bound to the surface of the catalyst forming a coating, and carbon compounds, such as carbon monoxide, which is adsorbed onto the surface, and can dissociate into atomic oxygen and carbon, resulting in carbonation.

The oxidation of catalytic poisons from the surfaces of the catalytic convertor removes the poisons from the catalytic surfaces so that the efficiency of the catalyst is improved, allowing the effective use of a catalyst bed having a smaller volume than that used in a typical catalytic convertor today. Therefore the introduction of free radicals and related gaseous oxidizing species by means of a corona generator has two independent effects that reduce the emission of pollutants. First, the catalytic action of the radicals and related gaseous oxidizing species directly removes pollutants from the exhaust gas stream. In addition, the removal of all or some of the poisons on the catalyst bed surfaces, in particular, the surfaces of the noble metals, improves the efficiency of the removal of pollutants, $NO_x$ in particular, by the catalytic convertor.

Figure 1:
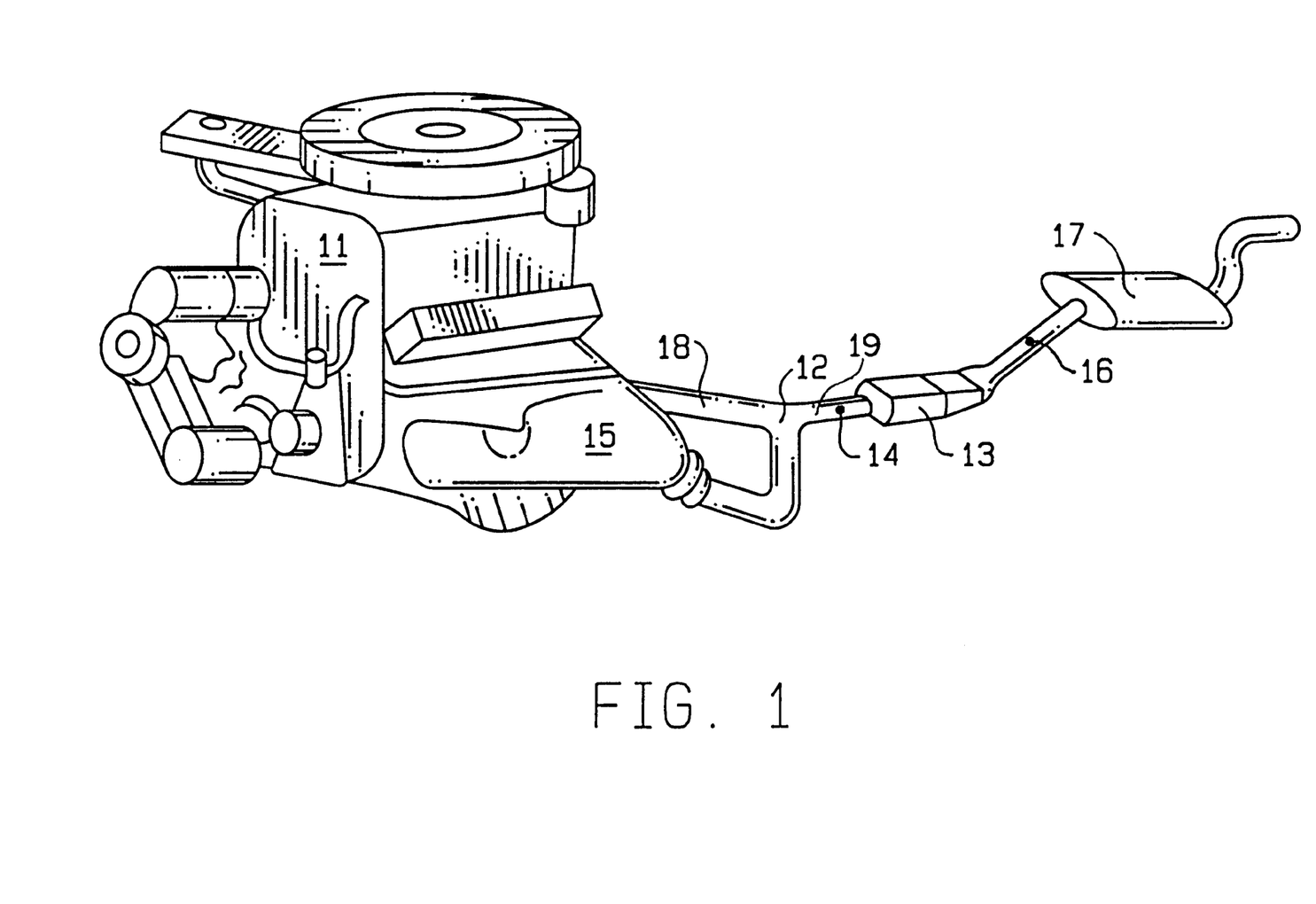
FIG. 1 is a side perspective view of an internal combustion engine having a catalytic converter.

Referring to FIG. 1, a typical configuration for a modern automobile engine 11 having a catalytic converter 13 is illustrated. The catalytic converter 13 is positioned at the underbody of the automobile (not shown), and is situated in the exhaust gas stream 18 from the engine, in the exhaust pipe 12 downstream from the exhaust manifold 15, and before the muffler 17. Although this is the configuration commonly used today, it should be noted that a growing number of automobiles are being produced with closely coupled catalytic convertors that are positioned closer to the engine than shown in FIG. 1, such that the catalytic convertor is adjacent to or part of the exhaust manifold of the engine. In most automobiles produced today, an oxygen sensor 14 is positioned in the exhaust system just upstream of the catalytic convertor 13. Data from the oxygen sensor 14 are used by the electronic controller of the fuel injection system to maintain a stoichiometric air/fuel ratio. Often, a second oxygen sensor 16 is located just downstream of the catalytic convertor to provide additional data for the fuel injection controller and the onboard diagnostics of the vehicle.

The catalytic converter 13, as contemplated for use in the present invention, includes any device which is provided for treating exhaust gases from the combustion of a fuel, such as, for example, gasoline, gasoline-based formulations, diesel fuel, alcohol, natural gas and any other fuel, where a catalytic converter can be used to reduce at least one pollutant from combustion, such as, for example, CO, HC, and/or $NO_x$, including, but not limited to, a three way catalyst typically used in today's modern automobile engines.

The catalytic converter 13 therefore comprises any device that catalytically removes or participants in the removal of at least one pollutant from an exhaust stream generated by burning a fuel, including, but not limited to, those with monolithic or granular ceramic substrates, metallic substrates, or substrates of any kind, and devices with noble metals or any other type of catalytic material. It would also include, without limitation, devices having semiconductor catalysts, such as oxides or sulfides of transition elements, and devices having ceramic-type catalysts, such as alumina, silica-alumina, and zeolites individually, in combination with each other and oxygen storage media such as cerium oxide or in combination with metal catalysts.

In one embodiment of the invention, oxidizing radicals and related gaseous oxidizing species are introduced into the exhaust stream upstream of or at the catalytic convertor, and, preferably, upstream of the oxygen sensor 14, which is installed in almost all modern cars and light trucks. Hydroxyl radicals, OH, and atomic hydrogen, H, are produced from water vapor in the exhaust gas of the engine by an electrical corona discharge. Similarly, the corona discharge may also produce atomic oxygen, O, from residual oxygen, $O_2$, in the exhaust gas. Typically, these radical species then react with other gaseous species in the exhaust stream to form other oxidizing species, such as $NO_2$, $H_2O_2$, $HO_2$, and $O_3$.

Figure 2:
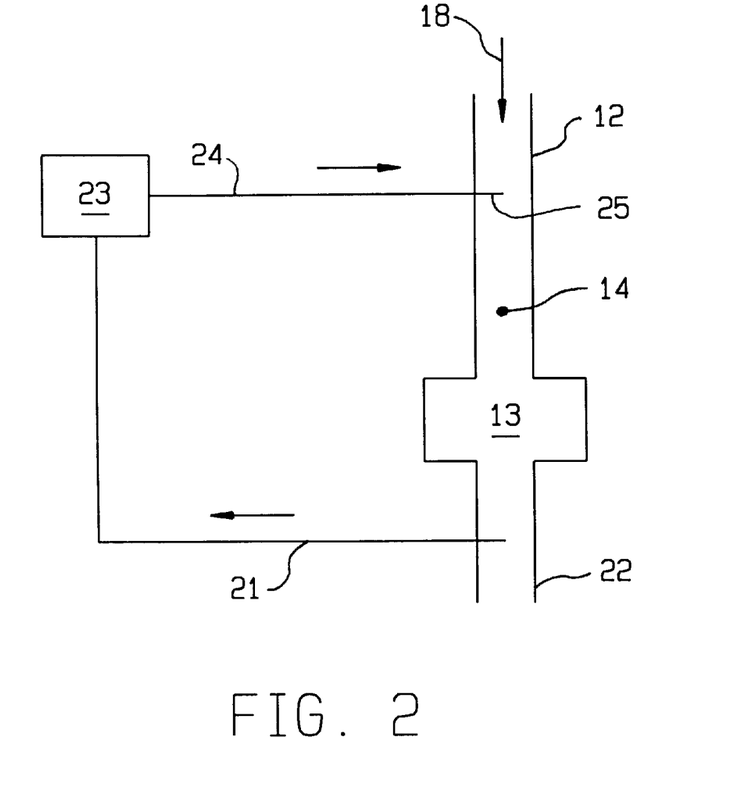
FIG. 2 is a schematic of an exhaust system incorporating a remote corona discharge radical generator.

The exhaust gas used to produce the free radicals may be taken from the downstream end of the catalytic convertor by diverting a portion of the downstream exhaust to a radical generator, and introducing the output of the radical generator into the exhaust upstream of or at the catalytic convertor, as shown schematically in FIG. 2. By operating the corona discharge device in exhaust gas taken from the downstream end of the catalytic convertor, the corona operates in a cleaner environment, substantially free from the pollutants removed by the action of the catalytic convertor and the oxidizing radicals and related gaseous species, which are produced by the discharge, and introduced upstream of the catalytic convertor. This results in an improved discharge device lifetime, and substantially eliminates fouling problems that may occur when the corona discharge device is positioned upstream of or at the catalytic convertor. However, when used upstream of or at the catalytic convertor, the corona discharge itself should naturally reduce or eliminate its own potential contamination.

As shown in FIG. 2, a portion of the cleaned exhaust gas stream 21 that has passed through the catalytic convertor 13 is taken from the rear exhaust pipe 22, and diverted to the remote corona discharge radical generator 23. The output 24 of the remote corona discharge radical generator 23 is enriched with radicals as a result of the action of the corona on the exhaust gas 21, and is introduced into the exhaust gases in the tailpipe 12 upstream of or at the catalytic convertor 13. Preferably, an oxygen sensor 14, such as that found on most modern cars and light trucks, is positioned in the exhaust stream 18 upstream of the catalytic convertor 13, but downstream of the point 25 where the oxidizing species are introduced into the exhaust stream. However, because of the higher pressures in the exhaust system, pumping, such as with a Venturi (not shown), is required to accomplish direct injection of the output of a remote generator into the exhaust gas stream. Therefore, the direct, in situ production of free radicals by the action of a corona discharge on water vapor and residual oxygen in the exhaust stream is the most preferred method.

Figure 3:
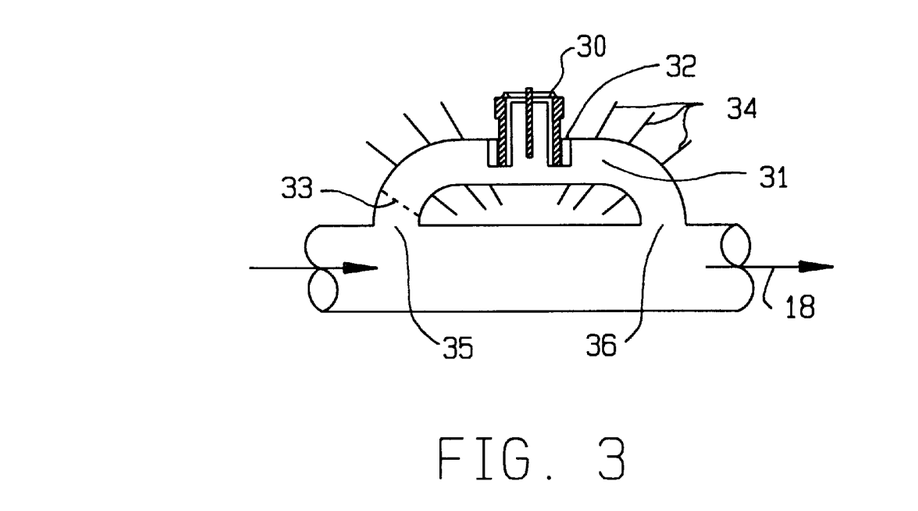
FIG. 3 illustrates a corona discharge device mounted in an exhaust shunt.

Preferably as shown in FIG. 1, the radicals and related gaseous oxidizing species are produced in the exhaust upstream of or at the catalytic convertor by a corona discharge device, placed in either the main exhaust pipe or in a shunt path in parallel with the main exhaust gas stream, as shown in FIG. 3. As shown in FIG. 3, a corona discharge device 30 is mounted in an exhaust shunt 31 in mount 32. The exhaust shunt 31 allows a portion of or at the exhaust gas stream 18 to bypass a section of or at the exhaust pipe 12, by exiting the exhaust pipe 12 at a first point 35, typically upstream of or at the catalytic convertor 13, and re-entering the exhaust pipe at a second point 36, which is also typically upstream of the catalytic convertor 13. The exhaust shunt will preferably include a restrictive orifice 33 or other device into the shunt to regulate or control the exhaust gas flow rate. Such a shunt path is useful in that it allows the corona discharge device to be operated in a lower temperature environment than that of the exhaust gas stream. Preferably, the heat loss of the shunt path is improved by providing an increased surface area with, e.g., cooling fins 34 or similar devices.

A lower temperature environment simplifies the design and choice of materials for the corona discharge device, particularly with regard to the electrical properties of the device during high temperature operation and its thermal design. This is particularly important, because the resistivity, loss tangent, and dielectric constant of the materials in the corona discharge device change with increasing temperatures. The change in these properties that occurs at high temperatures can seriously degrade the efficiency of the corona discharge device, decreasing the production of free radicals, and, thus, increasing the emission of pollutants. Where a corona discharge device is operated in a high temperature environment, the choice of materials is limited to those that experience a limited change in electrical properties with increasing temperatures. However, where the corona discharge device is operated in a lower temperature environment, such as that of a shunt path, other, less expensive materials that possess the desired electrical properties at lower temperatures, but lack the desired properties at high temperature may be used.

Operation at lower temperatures also reduces or eliminates problems related to a mismatch in the thermal coefficient of expansion of materials in the corona discharge device, its support, and the exhaust pipe. This reduces or eliminates strain induced material and seal failures, as well as failures caused by the numerous thermal cycles the corona discharge device will experience during the lifetime of the engine.

The free radicals may also be produced in the precombustion gas stream by a corona discharge upstream of the point that the air and fuel are mixed, such as in the intake manifold of an engine equipped with a port fuel injection system. A drawback of the production or injection of the oxidizing species in the intake manifold is that a significant fraction of the highly chemically active species may be destroyed in the combustion process, and only those active species that reside in the crevice regions and at the walls of the combustion chamber can effectively survive, and enter into the exhaust gas stream where they are useful in oxidizing CO and HC. In contrast, generators that inject free radical and gaseous molecular oxidizers directly into or which create these species in the exhaust (postcombustion) gas stream can more effectively deliver the active species into the exhaust stream where CO and HC need to be oxidized. Thus, the relative amount of radicals that must be produced to provide a given amount of radicals at the catalytic convertor is significantly smaller when the oxidizing species are produced in or introduced into the exhaust gas stream than the amount required for other methods. This directly translates into proportionally lower electrical input demands for the radical generator.

A corona discharge device for use with the invention should preferably be capable of functioning for at least about 3,000 to about 4,000 hours in the high temperature environment of the exhaust stream of an internal combustion engine before replacement is required. Because of space limitations in modern automobiles, it is preferred that the corona discharge device have a small-physical volume, i.e., on the order of the size of a typical spark plug, and require a power supply that is no larger than about 300 to about 400 cubic cm. In certain embodiments, in addition to operating at a temperature on the order of about 800° C., the corona discharge device must meet automotive electromagnetic interference (EMI) requirements, be readily replaceable, and be capable of withstanding thousands of thermal transients of about 800° C. during start-up and cool down of the engine, as well as several million smaller thermal transients where the change in temperature is on the order of about 200° C. In a preferred corona discharge device, about 20 to about 50 W of high frequency, high voltage power is required, i.e., from about 1,000 to about 1,000,000 Hz and from about 5,000 to about 20,000 V. However, under some transient operating conditions, such as engine cold or warm starts, more radical production may be desired. In this case the corona device would require operation at higher power levels of up to 200 to 300 watts. This transient power condition can be met by upping the frequency voltage product to the corona device by a factor of 5 to 10 for such periods, which typically range from about 30 to about 100 sec. This can be accomplished through proper corona unit high voltage power system design, and the use of control signals from the engine controller or local startup temperature readings.

Figure 4:
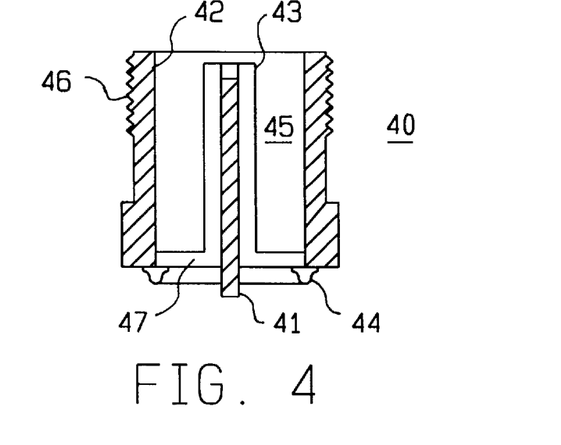
FIG. 4 illustrates a corona discharge device having concentric electrodes and a dielectric coated inner electrode.
Figure 5:
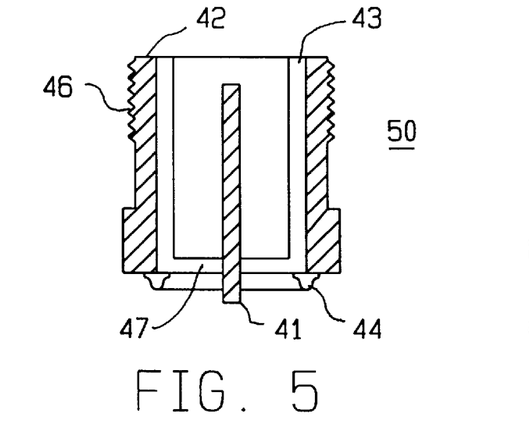
FIG. 5 illustrates a corona discharge device having concentric electrodes and a dielectric coated outer electrode.
Figure 6:
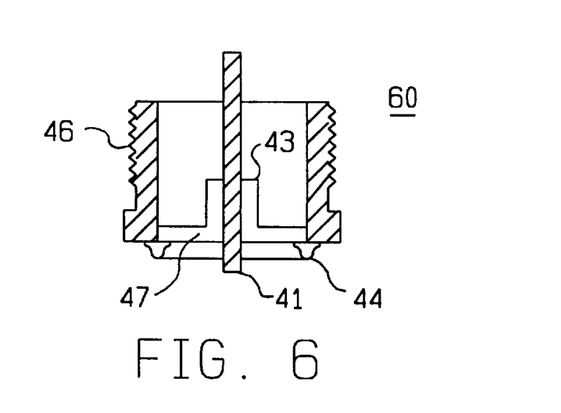
FIG. 6 illustrates a distant ground corona discharge device.

Corona discharge devices useful in the invention include, but are not limited to, those having generally cylindrical symmetry and, in most cases, at least two concentric electrodes. At least three general design alternatives for corona discharge devices that have generally cylindrical symmetry exist. Three general design alternatives are illustrated in FIGS. 4, 5, and 6. FIG. 4 is a cross-section of a cylindrical corona discharge device 40 having concentric cylindrical electrodes inner electrode 41 and outer electrode 42. The device 40 typically includes a ferrule 44 in the base 47, which provides a gas seal, and threads 46 or other means for mounting the device 40 in the exhaust pipe 12 or shunt 31. The inner electrode 41 is surrounded by a dielectric layer 43, which prevents breakdown, and maintains the corona discharge. It is important for the overall efficiency of the device to have the predominant voltage across the "air" gap 45 of the device. Because the dielectric layer 43 in the corona discharge device shown in FIG. 4 is located in a region where high electric fields occur, the dielectric constant of the layer should be in the range of from about 4 to about 10 to limit the voltage drop across the dielectric layer. As a result, most of the voltage is across the "air" gap of the corona discharge device, and the efficiency of the device is maintained.

However, depending on the design of the corona discharge device, the dielectric, due to its conductivity, may act as a shunt conductive path to ground that effectively reduces the current to the corona discharge. Where the corona discharge device is subject to shunt capacitive losses in the region of the base 47 that increase proportionally with increasing dielectric constant, a decision is often required during the design of a corona discharge device of this type, as to the relative importance of the voltage drop across the dielectric and the shunt capacitive losses in the base region. In practice, the careful design of the corona discharge device will minimize the effective area of the shunt capacitance and provide the lowest possible dielectric constant.

Resistive losses also occur in dielectrics at high temperatures, and, thus, a dielectric material must be selected in which the resistive losses are acceptably low, or the corona discharge device must be operated in a chamber or shunt path off of the exhaust system to allow operation at a lower temperature. Other design issues include EMI, resistance to corrosion in the corrosive, high temperature environment, contamination, condensation of water during engine cool down, and vibration. For EMI, the corona discharge device and its power supply and leads must have sufficient shielding to meet automotive system EMI requirements.

Material selection should be based on high temperature behavior and the ability to withstand a corrosive environment that could limit the design life or performance of the device, e.g., high temperature diffusion of contaminants into the dielectric that could lower the resistivity of the dielectric below the required value for maximum efficiency, and possibly result in the formation of a partial or complete short circuit in the device. However, the corona discharge itself should naturally reduce or eliminate contamination of the device.

The need for a high dielectric constant can be reduced or eliminated by placing the dielectric layer 43 on the inner surface of the outer electrode 42. Such a device 50 is illustrated in FIG. 5. Because the electric fields that occur in the region of the outer electrode 42 are relatively low compared to those in the region of the center electrode 41, a dielectric material having a low dielectric constant, i.e., on the order of from about 2 to about 3, may be used for the dielectric layer. This reduces shunt capacitive losses, while maintaining a limited voltage drop across the dielectric layer.

It is also possible to use the exhaust pipe 12 or exhaust shunt 31 as a distant ground for the corona discharge device, eliminating the need for an outer electrode. Such a distant ground corona discharge device 60 is shown in FIG. 6, and only requires an inner electrode 41, preferably, with a sharp or small radius tip to promote breakdown, a dielectric insulator 43, and a base 47, which typically includes a ferrule 44 to provide the required seal and strain relief. Because a distant ground device is only subject to base loss considerations, such a device also allows the use of dielectric materials having a low dielectric constant.

Figure 7:
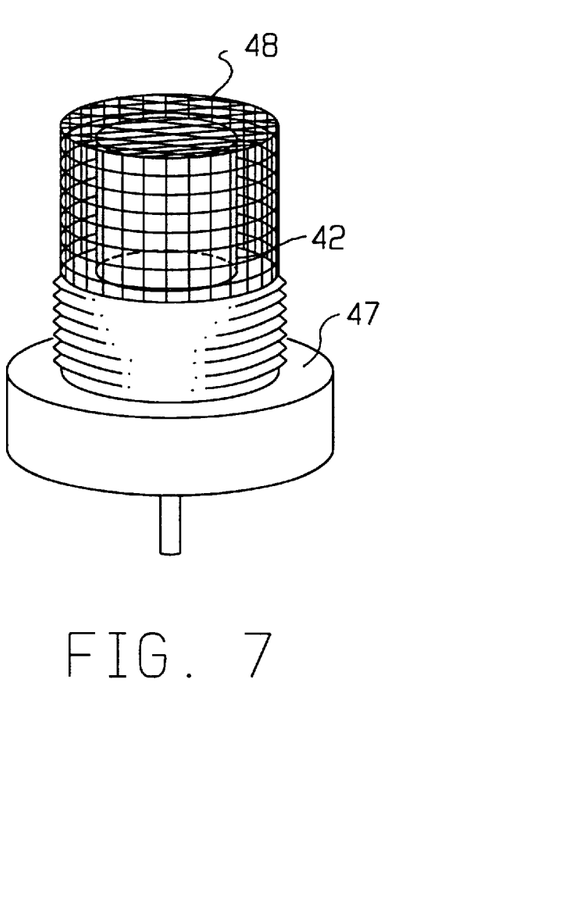
FIG. 7 illustrates a corona discharge device of the type depicted in FIG. 5 equipped with a flame arrester.

It may also be desirable in some applications to include one or more flame arresters in the design of the corona discharge device. Such a device is shown in FIG. 7, in which a corona discharge device 50 having an outer electrode 42 coated with a dielectric layer 43 is capped with a flame arrester 48 in the form of a wire screen. Such a flame arrester will prevent the ignition of exhaust gases containing fuel and oxygen during engine starts and misfires.

However, in some applications, the ignition of exhaust gases to initiate partial or complete combustion of residual fuel in the exhaust gases is desirable, thereby reducing harmful emissions, such as, e.g., during the cold start phase of the engine operation or under conditions where the engine misfires. Such corona assisted combustion of residual fuel and hydrocarbons is possible without the production of additional $NO_x$ due to the low temperature of the combustion process in the exhaust stream.

Under conditions where the engine misfires, the fuel air mixture will be substantially stoichiometric, and no additional air is required to initiate combustion of the resulting exhaust gas. However, to initiate combustion of the residual fuel in the exhaust during cold start conditions, additional air must be added to the exhaust gas stream upstream of the corona discharge device, as the exhaust gases are fuel rich under those conditions. The oxygen required for combustion can be provided through controlled injection of air, either by self pumping, such as through the pumping action of a Venturi section in the exhaust pipe, or by an upstream air pump. With a Venturi, a fast acting valve, such as an electromechanical valve or a valve based on MEMS (Micro Mechanical-Electronic Systems) technology would be required to terminate the air injection after the cold start period was complete. The rate of air injection is limited with a Venturi, and, thus, only partial combustion of residual fuel is possible with Venturi pumping. However, an air pump is not subject to such a limitation, and can provide sufficient air for complete combustion of any residual fuel in the exhaust gas stream.

Where the ignition of exhaust gases by the corona discharge is desired, it may also be desirable to use flame arresters, such as wire screen to control or limit the regions of the exhaust stream in which corona assisted combustion could occur to any of, e.g., upstream of the corona discharge device, downstream of the device, both upstream and downstream of the device, or in a limited volume in and around the corona discharge device.

The corona discharge devices shown in FIG. 4 and FIG. 5 are essentially modified sparkplug-like devices, having a small center electrode 41 with a diameter of about 0.1 to about 0.3 cm. The inner electrode 41, is inserted into and held in place by a hole in the dielectric layer 43 in the base 47. In devices where the dielectric layer 43 is positioned on the inner surface of the outer electrode 42, the dielectric layer 43 basically forms a cup having a hole in its base to position the inner electrode. The outer electrode has an inner diameter of about 1 to about 2 cm and a length of about 1.5 to 3 cm. The dielectric layer has a base and wall thickness of about 1 to about 3 mm, which is chosen to provide the desired dielectric strength at the operating voltage of the corona discharge device.

The dielectric layer adjacent to the interior wall of the outer electrode and the "air gap" between the dielectric layer and the inner electrode are essentially two series capacitances. Because they are in series, the currents through the air gap and the dielectric are equal, and, thus, the instantaneous corona power dissipation for cylindrical electrodes may be expressed as $$P_i = V_i I_d = \omega C_d \cdot V_s \cos(\omega t).$$

The average power dissipation is then expressed as $$P = \langle Pi \rangle = 4 C_d \cdot V_s f \left[ V_o - \left( \frac{C_d + C_g}{C_d} \right) V_s \right]$$

where $C_d$ is the solid dielectric capacitance, $C_g$ is the air gap capacitance, $V_s$ is the spark breakdown potential, $V_o$ is the applied voltage, and $f = \omega / 2\pi$.

This means that, using "spark plug" technology, a very compact, replaceable corona discharge unit can be produced, having the required power level.

The outer surface of the outer electrode is typically used to mount the corona discharge device in the exhaust pipe or manifold, an exhaust shunt path, in an anterior chamber to the exhaust pipe, a mounting plate on or in one of these devices, or any other simple means of mounting the corona discharge device that provides a good exhaust gas seal. This simple mounting scheme allows easy removal and installation of the corona discharge device in the exhaust system, and with a shunt path or slight recess in the exhaust system represents little or no interference to the main exhaust flow. In each case, the corona discharge device is placed in the exhaust gas of the engine, so that the desired free radicals are produced directly from water and residual oxygen in the exhaust.

The condensation of water during cool down could result in a short out of the corona discharge device, and, thus, the device is preferably mounted in the top of the exhaust pipe, so that the electrodes face down, minimizing the exposure to water during those times when the temperature is too low to drive off any water. In addition, vibration problems may be avoided by designing the device and its power supply and wiring to have natural resonant frequencies well above automobile vibrational frequencies.

As discussed above, the resistive and capacitive shunt losses of the dielectric layer used to provide an insulating support between the two electrodes of a corona discharge device are a major consideration in the design of such a device. Any reduction in shunt capacitance allows operation of the discharge at higher frequencies at a given capacitive power loss, and, according to basic design principles for a corona device having a power output proportional to the frequency of the applied voltage, would allow a more compact design. A more compact design is advantageous in that it allows the use of a smaller corona gap, which, in turn, results in a lower breakdown voltage across the gap, and, thus, allows the use of a lower operating voltage. The lower operating voltage results in lower resistive and capacitive losses, increasing the efficiency of the corona discharge device. The smaller, more efficient corona discharge device will thus require a smaller power supply, which is a major advantage in modern vehicles where space is at a premium.

Figure 8:
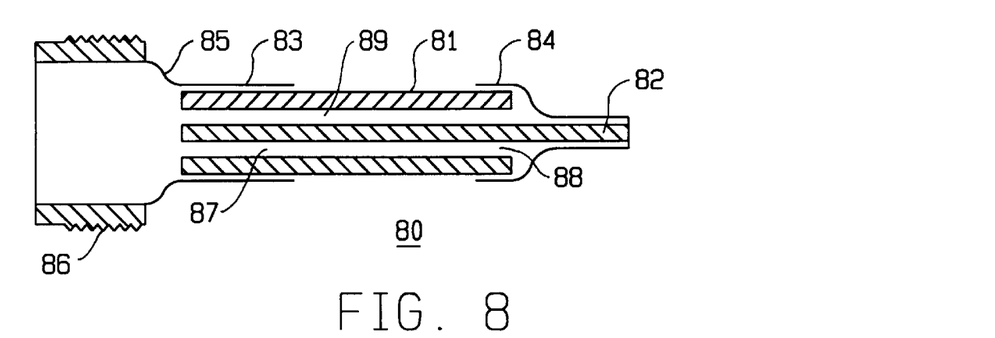
FIG. 8 illustrates a compact corona discharge device.

A representative design for such a compact corona discharge device is shown in FIG. 8. FIG. 8 illustrates the physical components of an efficient compact corona discharge device 80, as well as the important device operating and device design regions. The illustration, as well as the dimensions given below, is merely representative of a generic design, and one of ordinary skill in the art will recognize that many variants that fall within the scope of the general design principles illustrated and discussed here.

The key features of the embodiment illustrated in FIG. 8 include a long, thin-walled dielectric insulator 81 that, along with the proper selection of materials, provides a path of high resistance between the inner 82 and outer 83 electrodes that are supported by the insulator 81. A thin metal cap 84 is provided as a gas seal. The inner electrode 82 is typically substantially longer than the outer electrode 83, having a length that is at least about twice that of the outer electrode 83, and, preferably, at least about 4 times the length of the outer electrode 83. The length of the inner electrode 82 is typically about at least about 4 times, referably at least about 6 times, the diameter of the corona discharge device 80, as determined from the diameter of the dielectric insulator 81. The outer electrode 83 is mechanically and electrically connected to the base 85 of the compact corona discharge device 80, where the base includes threads 86 or other similar mounting means to mount the device 80, such that exhaust gases may enter into the air gap 89. As a result of the difference in the length of the inner and outer electrodes 82 and 83, the air gap 89 is divided into a corona discharge region 87, i.e., that part of the air gap 89 where the inner and outer electrodes overlap, and a ullage volume 88, i.e., that portion of the air gap 89 that extends from the outer electrode 83 to the metal cap 84.

A typical compact discharge device 80 may have an outer electrode 83 with a length of about 1 to about 2 cm, preferably about 1.5 cm, and an inner electrode 82 with a length of about 4 to about 8 cm, preferably about 5 to about 7 cm, most preferably about 6 cm. The dielectric insulator 81 of such a device can be constructed from a ceramic material such as Fosterite, and will have a diameter of about 0.7 to about 1.3 cm, preferably about 1 cm, a length of about 3 to about 5 cm, preferably about 4 cm, and a thickness of about 0.1 to about 0.2 cm, preferably about 0.15 cm, can be used at a temperature of up to about 900° C. with resistive power losses of less than about 10% at a maximum operating voltage of at least about 5,000 V. In a relatively low temperature environment, such as that in an exhaust shunt, and because of the temperature variation along the ceramic dielectric insulator 81, an even higher operating voltage is possible, while maintaining an acceptable power loss. A corona discharge device of this design would provide about 30 to about 50 W of power operating at a frequency of about 100 kHz. However, under some transient operating conditions, such as engine cold or warm starts, more radical production may be desired. In this case, the corona device would require operation at higher power levels of up to 200 to 300 watts. This transient power condition can be met by upping the frequency voltage product to the corona device by a factor of 5 to 10 for such periods, which typically range from about 30 to 100 sec. This can be accomplished through proper corona unit high voltage power system design and the use of control signals from the engine controller or local startup temperature readings. The long insulating path and thin walls of the insulator 81, minimize the capacitive shunt losses to less than about 10%, even for insulators having a dielectric constant of more than 10 at operating frequencies on the order of about 100 kHz. Such a high operating frequency allows the use of a very compact high voltage power supply.

As discussed above, the expression for the power dissipation in a corona is given by $$P = 4C_d \cdot V_s \cdot f\{V_o - ((C_d + C_g)/C_d) \cdot V_s\},$$

where $C_d$ and $C_g$ are respectively the capacitance of the dielectric and the gap in the corona region, $V_s$ and $V_o$ are respectively the spark breakdown voltage of the gap and the applied voltage to the corona device, and f is the frequency of the voltage applied to the device. Taking values of these quantities of as $V_o = 5{,}000$ V, $V_s = 3{,}000$ V, $C_d = 6 \times 10^{-12}$ farad, $C_g = 1 \times 10^{-12}$ farad; then at a frequency of $3 \times 10^5$ Hz, the power in the corona is about 27 W. The output can be scaled by frequency, applied voltage, or capacitance (primarily the length of the corona discharge region). The output can be controlled by the frequency and/or voltage of the corona device power source.

The spark breakdown voltage is almost directly proportional to the density of the exhaust gas in the corona gap region, which is almost directly proportional to the temperature in the gap region. This breakdown voltage will vary in proportion to the temperature of the gas in the corona unit, and, therefore, its operating temperature. If, for example, the design were such that the gas temperature in the corona unit were half of the exhaust temperature, then the lower breakdown voltage would increase to 6,000v.

Figure 9:
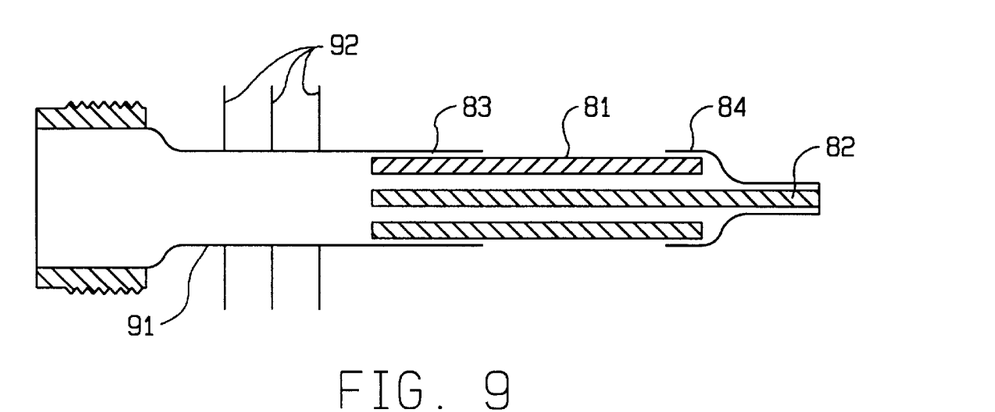
FIG. 9 illustrates a compact corona discharge device having an extended skirt.
Figure 10:
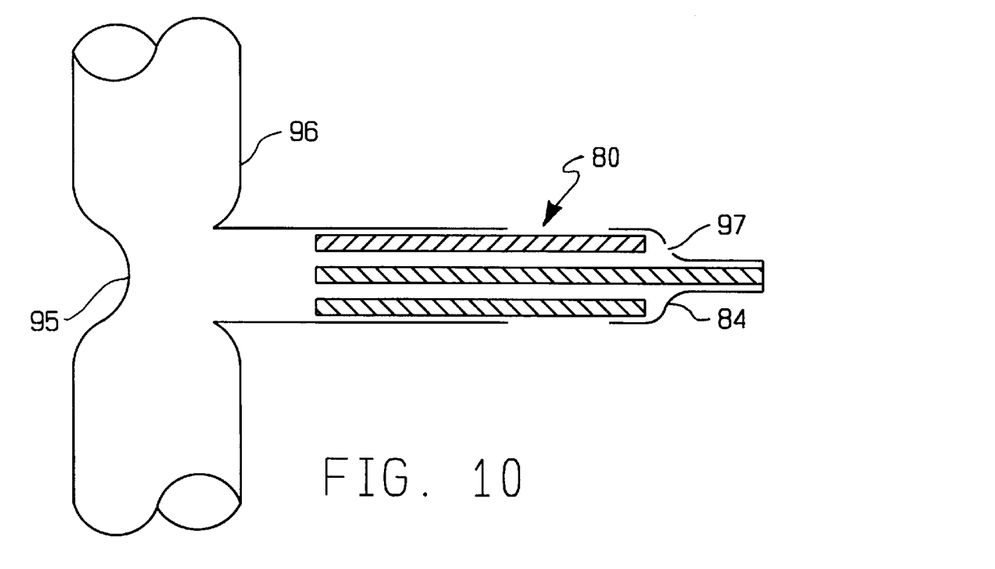
FIG. 10 illustrates a compact corona discharge device equipped with an orifice for injecting air.

FIGS. 9 and 10 show two design variants on the above design. In FIG. 9 the skirt section 91 is lengthened and extended surfaces 92 are employed to augment heat exchange to the ambient environment. The longer conduction path along with the heat exchangers provide for cooler operation of the dielectric material 81 in particular, thus providing for a wider selection of materials or better performance for this application with satisfactory resistance and capacitance at the resulting operating temperature. It has also been observed in tests that the injection of small amounts of air (<10 cc/sec) upstream of the engine side oxygen sensor results in no adverse engine performance or engine/catalyst emission performance. In FIG. 10 a pumping action is provided by the low pressure produced in a Venturi section 95 added to the exhaust system 96. This low pressure in conjunction with the orifice 97 in the metal cap 84 of the compact corona discharge device 80 provides for an air flow of less than about 10 cc/sec, which limits the temperature, which cools the ceramic dielectric section of the corona device, and aids in the injection of radicals generated in the corona discharge.

Figure 11:
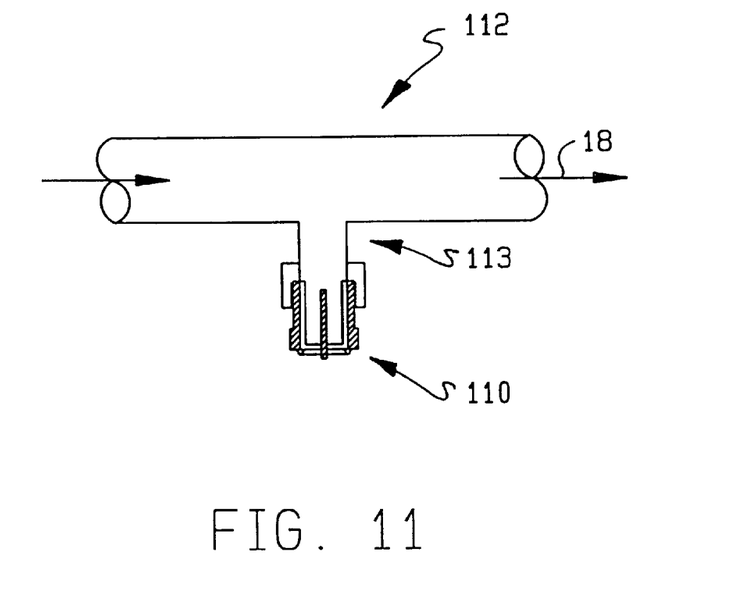
FIG. 11 illustrates a corona discharge device mounted in a manner that takes advantage of the pumping action of pressure variations in the exhaust gas stream.
Figure 12:
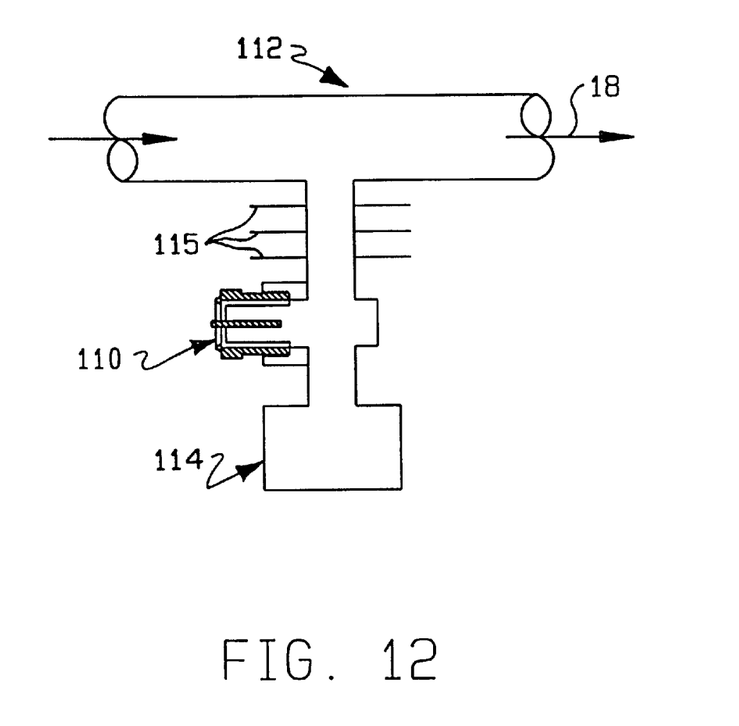
FIG. 12 illustrates a corona discharge device mounted in conjunction with a plenum that augments the pumping action of pressure variations in the exhaust gas stream.

Under normal operating conditions, the engine produces exhaust gas pressure oscillations having a frequency of about 30 to about 100 Hz and a peak to peak variation of about 20 to about 80%, depending upon the location in the exhaust system. These pressure oscillations in conjunction with the ullage volume 88 provide an effective, continuous pumping action of the radicals and other species produced in the corona discharge into the exhaust stream. The pumping effect of the exhaust gas pumping oscillations for any of the corona discharge devices described above, where the discharge device 110 is installed at a point on the exhaust pipe 112 where the oscillations occur, in the manner shown in FIG. 11, where the discharge device 110 is mounted on a simple "T" 113 off the side of the exhaust pipe 112. The pumping effect and the total gas motion can be augmented with a plenum 114 as shown in FIG. 12. In addition, cooling fins 116 may be added to lower the operating temperature for the discharge device 110. As noted above, a cooler operating environment improves the efficiency of the corona discharge.

It should be noted that the only requirement of the preceding embodiments of the present invention is that free radicals or gaseous oxidizing species, in particular, hydroxyl radical, are added to the combustion gas stream at a point upstream of or at the catalytic converter, for example, the air intake duct to the carburetor or fuel-injection systems of the combustion chamber, the air/fuel intake manifold to the combustion chamber, the combustion chamber directly or the exhaust manifold of the combustion chamber, or the exhaust pipe.

Moreover, while the present invention has been described with reference to a catalytic converter, it is contemplated that only the high surface area provided by the converter in conjunction with the introduction of hydroxyl radicals would be required to reduce the pollutants in the exhaust gases of a combustion engine.

Although the present invention has been described with particular reference to its preferred embodiments, it should be understood that many variations and modifications will now be obvious to those skilled in that art, and, therefore, the scope of the invention should not be limited by the specific disclosure herein, but only by the appended claims.

What is claimed:

1. An apparatus for reducing at least one pollutant in an exhaust gas stream containing exhaust gas formed from the combustion of fuel in an engine, the apparatus comprising:

a catalytic convertor, having an inlet and an outlet, wherein the catalytic convertor is positioned such that at least a portion of the exhaust gas stream from the engine passes through the catalytic convertor;

a corona discharge device for producing a corona discharge in the exhaust gas, the corona discharge device comprising at least one first electrode, at least one second electrode positioned a distance from the first electrode and a dielectric material positioned between the first electrode and the second electrode; and a high frequency power supply having an operational frequency of at least about 1,000 Hz adapted to provide electrical power to the corona discharge device, wherein at least a portion of the exhaust gas stream is exposed to the corona discharge to produce radicals from gaseous species in the exhaust gas stream, and the radicals are introduced into the exhaust gas stream at a point upstream of or at the catalytic convertor.

2. The apparatus of claim 1, further comprising an exhaust pipe attached to the inlet of the catalytic convertor, such that at least a portion of the exhaust gas stream passes through the exhaust pipe to and through the catalytic convertor, wherein the exhaust pipe comprises a fitting for positioning the corona discharge device in the exhaust stream or a portion thereof, so that a corona discharge is produced in the exhaust stream upstream of or at the catalytic convertor.

3. The apparatus of claim 2, further comprising an oxygen sensor positioned between the corona discharge device and the inlet of the catalytic convertor.

4. The apparatus of claim 2, wherein the corona discharge device is positioned in a shunt attached to the exhaust pipe, such that at least a portion of the exhaust gas stream enters the shunt from the exhaust pipe at a first point, and re-enters the exhaust pipe at a second point upstream of or at the catalytic convertor.

5. The apparatus of claim 4, wherein the shunt comprises one or more extended surfaces for removing heat from the shunt.

6. The apparatus of claim 2, further comprising at least one flame arrester positioned to prevent flame from propagating in the exhaust pipe.

7. The apparatus of claim 6, wherein the at least one flame arrester is positioned downstream of the corona discharge device and upstream of or at the catalytic convertor.

8. The apparatus of claim 6, wherein at the least one flame arrester is positioned upstream of the corona discharge device.

9. The apparatus of claim 2, wherein the corona discharge device is positioned such that naturally occurring pressure fluctuations in the exhaust stream provide a pumping action that forces exhaust gas into the corona discharge device, and scavenges gases containing radicals produced in the corona discharge from the corona discharge device.

10. The apparatus of claim 9, further comprising a plenum positioned adjacent to the corona discharge device, such that exhaust gas pass from the exhaust pipe, through the corona discharge, into the plenum, and back into the exhaust pipe.

11. The apparatus of claim 2, wherein the exhaust pipe functions as a distant ground for the corona discharge device.

12. The apparatus according to claim 2, further comprising a device for injecting air into the exhaust stream during fuel rich cold start operating conditions, such that the corona discharge causes the combustion of residual fuel in the exhaust stream.

13. The apparatus of claim 1, wherein the corona discharge device comprises generally concentric electrodes, such that the corona discharge device forms the corona discharge in an air gap between the electrodes.

14. The apparatus of claim 13, wherein the concentric electrodes comprise an inner electrode, an outer electrode having an inner surface and an outer surface, and a dielectric material, which forms a layer on at least one of the inner electrode or the inner surface of the outer electrode.

15. The apparatus of claim 14, wherein the outer electrode comprises a wire or mesh.

16. The apparatus of claim 15, wherein the outer electrode includes a wire screen or mesh top portion, such that the air gap is totally enclosed by the electrodes and the dielectric, and the wire screen or mesh portion of the outer electrode acts as a flame arrester.

17. The apparatus of claim 14, wherein the dielectric material has a dielectric constant in the range of from about 2 to about 10.

18. The apparatus of claim 14, wherein the dielectric material comprises a layer on each of the inner electrode and the outer electrode.

19. The apparatus of claim 1, further comprising an exhaust pipe attached to the inlet of the catalytic convertor, a tailpipe attached to the outlet of the catalytic convertor, such that at least a portion of the exhaust gas stream passes from the exhaust pipe to and through the catalytic convertor and through the tailpipe, the tailpipe having an exhaust gas takeoff for conveying a portion of the exhaust gas stream to a remote radical generator, which comprises the corona discharge device, for producing radicals in the exhaust gas in the portion of the exhaust gas stream conveyed to the remote radical generator, and a remote radical generator output for returning the exhaust gas containing radicals from the remote radical generator to the exhaust gas stream at a point upstream of or at the catalytic convertor, where the exhaust gas containing radicals is injected into the exhaust gas stream.

20. The apparatus of claim 19, further comprising an oxygen sensor positioned between the inlet of the catalytic convertor and the point upstream of or at the catalytic convertor where the exhaust gas containing radicals is introduced into the exhaust gas stream.

21. The apparatus of claim 1, configured and adapted to expose only a portion of the exhaust gas stream to the corona discharge.

22. The apparatus of claim 1, wherein the power supply is configured and adapted to produce from about 5 to about 20 kV at a frequency of from about 1 to about 1,000 kHz.

23. The apparatus of claim 1, wherein the power supply is configured and adapted to produce from about 20 to about 50W of power during normal operations.

24. The apparatus of claim 23, wherein the power supply is configured and adapted to produce higher power for a period of up to about 100 seconds after engine startup.

25. The apparatus of claim 24, wherein the power supply is configured and adapted to produce up to about 300W for the period after startup.

26. The apparatus of claim 1, wherein the catalytic convertor comprises a three way catalyst.

27. An apparatus for reducing at least one pollutant in an exhaust gas stream containing exhaust gas formed from the combustion of fuel in an engine having a combustion gas stream, which comprises a precombustion gas stream and the exhaust gas stream, the apparatus comprising:

a catalytic convertor, having an inlet and an outlet, where the catalytic convertor is positioned such that at least a portion of the exhaust gas stream from the engine passes through the catalytic convertor;

a corona discharge device for producing radicals in the combustion gas stream of the engine, the corona discharge device comprising at least one first electrode, at least one second electrode positioned a distance from the first electrode, and a dielectric material positioned between the first electrode and the second electrode; and a high frequency power supply having an operational frequency of at least about 1,000 Hz adapted to provide electrical power to the corona discharge device, wherein at least a portion of the combustion gas stream is exposed to the corona discharge to produce radicals from gaseous species in the combustion gas stream, wherein the radicals are introduced into the combustion gas stream upstream of or at the catalytic convertor.

28. The apparatus of claim 27, wherein the radicals are produced in the precombustion gas stream.

29. The apparatus of claim 27, wherein the radicals are injected into the precombustion gas stream.

30. The apparatus of claim 27, wherein the catalytic convertor comprises a three way catalyst.

31. An apparatus for reducing at least one pollutant in an exhaust gas stream containing exhaust gas formed from the combustion of fuel in an engine, the apparatus comprising:
- a catalytic convertor, having an inlet and an outlet, wherein the catalytic convertor is positioned such that at least a portion of the exhaust gas stream from the engine passes through the catalytic convertor;
- a corona discharge device for producing a corona discharge in the exhaust gas stream, such that radicals are produced from gaseous species in the exhaust gas stream, and the radicals are introduced into the exhaust gas stream at a point upstream of or at the inlet of the catalytic convertor;
- an exhaust pipe attached to the inlet of the catalytic convertor, such that at least a portion of the exhaust gas stream passes through the exhaust pipe to and through the catalytic convertor, the exhaust pipe comprising a fitting configured for attaching the corona discharge device to the exhaust pipe and allowing exhaust gas to enter into and exit from the corona discharge device;

wherein the corona discharge device comprises:
- a first end, configured for attachment to the fitting, and to allow exhaust gas from the exhaust pipe to enter into and exit from the corona discharge device,
- a second end, configured to prevent exhaust gas from leaking from the corona discharge device,
- a generally cylindrical outer electrode, electrically and mechanically connected to the first end,
- an inner electrode, mounted concentric with, and partially surrounded by the outer electrode, and
- a dielectric, mounted concentric with, and positioned between the inner and outer electrodes, forming an air gap between the electrodes, the dielectric having a diameter that defines the corona discharge device diameter, wherein the inner electrode has a length that is greater than that of the outer electrode to provide a corona region in the air gap near the first end and a ullage volume in the air gap near the second end.

32. The apparatus according to claim 31, wherein each dimension of the corona discharge device is minimized, such that shunt resistive and capacitive power losses of the corona discharge are substantially minimized.

33. The apparatus according to claim 32, wherein the inner electrode has a length that is at least about twice that of the outer electrode and at least about 4 times that of the diameter of the compact corona discharge device defined by the dielectric insulator, such that shunt resistive and capacitive power losses of the compact corona discharge are substantially minimized.

34. The apparatus according to claim 33, wherein the length of the inner electrode is at least about 4 time that of the outer electrode and at least about 6 time the diameter of the compact corona discharge device.

35. The apparatus according to claim 31, further comprising an extended skirt section positioned between the base and the outer electrode to provide a lower temperature environment for the compact corona discharge device.

36. The apparatus according to claim 35, wherein the extended skirt further comprises at least one extended surface to improve heat loss from the compact corona discharge device.

37. The apparatus according to claim 31, further comprising an orifice in the cap to supply a controlled air flow through the compact discharge device for cooling, wherein the base of the compact corona discharge device is attached to a Venturi section in the exhaust to provide a low pressure in the device to draw air through the orifice.

38. The apparatus according to claim 31, wherein the corona discharge device is positioned such that naturally occurring pressure fluctuations in the exhaust gas provide a pumping action that forces exhaust gas into the corona discharge device, and scavenges gases containing radicals produced in the corona discharge from the corona discharge device.

39. The apparatus of claim 31, wherein the catalytic convertor comprises a three way catalyst.

40. A method for the reduction of at least one pollutant in an exhaust gas stream containing exhaust gas formed from the combustion of fuel in an engine having an exhaust pipe attached to an inlet of a catalytic convertor, the method comprising:
- passing the exhaust gas stream through the exhaust pipe and the catalytic convertor;
- forming radicals in at least a portion of the exhaust gas stream by generating a corona discharge therein, produced by a corona discharge device, which comprises at least one first electrode, at least one second electrode positioned a distance from the first electrode, and a dielectric material positioned between the first electrode and the second electrode,
- providing electrical power to the corona discharge device with a high frequency power supply having an operational frequency of at least about 1,000 Hz; and
- introducing the radicals into the exhaust gas stream upstream of or at the catalytic convertor.

41. The method according to claim 40, wherein the radicals are produced from at least one of water or residual in the exhaust gas.

42. The method according to claim 40, wherein the radicals react with gaseous species in the exhaust stream to form gaseous oxidizing species.

43. The method according to claim 42, wherein the radicals and gaseous oxidizing species comprise at least one of OH, O, H, $HO_2$, $H_2O_2$, $NO_2$, or $O_3$.

44. The method according to claim 40, further comprising forming the radicals in the exhaust gas stream in the exhaust pipe at a point upstream of or at the catalytic convertor.

45. The method according to claim 44, wherein an oxygen sensor is positioned in the exhaust pipe between the catalytic convertor and the point upstream of or at the catalytic convertor where the radicals are formed in the exhaust gas stream in the exhaust pipe.

46. The method according to claim 40, further comprising diverting at least a portion of the exhaust gas stream, conveying the diverted exhaust gas stream to a remote radical generator, forming radicals in the diverted exhaust gas stream using a corona discharge in the radical generator, and injecting the radicals into the exhaust gas stream in the exhaust pipe at a point upstream of or at the catalytic convertor.

47. The method according to claim 46, wherein an oxygen sensor is positioned in the exhaust pipe between the catalytic convertor and the point upstream of or at the catalytic convertor where the radicals are injected into the exhaust gas stream in the exhaust pipe.

48. The method according to claim 40, further comprising removing catalytic poisons from surfaces of the catalytic convertor by the reaction of the poisons with at least one of the radicals or gaseous oxidizing species formed from the reaction of radicals and gases in the exhaust stream.

49. The method according to claim 48, wherein the catalytic poisons comprise at least one of compounds of sulfur, phosphorus, or carbon.

50. The method according to claim 40, further comprising aiding combustion of fuel or hydrocarbons in the exhaust stream with the corona discharge during cold start or misfire conditions.

51. The method according to claim 50, further comprising injecting a controlled amount of air into the exhaust gas stream during cold start conditions to provide oxygen required for the combustion.

52. The method of claim 40, further comprising forming the radicals in only a portion of the exhaust gas stream.

53. The method of claim 40, further comprising producing a corona discharge whenever the engine is operating.

54. The method of claim 40, further comprising introducing the radicals in the exhaust gas stream, and reacting the radicals with at least one pollutant in at least one of the exhaust gas stream upstream of the catalytic convertor or in the catalytic convertor.

55. The method of claim 40, further comprising reacting the radicals with the at least one pollutant within the catalytic convertor.

56. The method of claim 40, further comprising reacting the radicals with at least one pollutant in the exhaust gas stream.

57. The method of claim 40, further comprising selecting a three way catalyst as the catalytic convertor.

58. A method for the reduction of at least one pollutant in an exhaust gas stream containing exhaust gas formed from the combustion of fuel in an engine having a combustion gas stream, which comprises a precombustion gas stream and an exhaust gas stream, and an exhaust pipe attached to an inlet of a catalytic convertor, the method comprising:

passing the exhaust gas stream through the exhaust pipe and the catalytic convertor;

forming radicals in at least a portion of the combustion gas stream by generating a corona discharge therein, produced by a corona discharge device, which comprises at least one first electrode, at least one second electrode positioned a distance from the first electrode, and a dielectric material positioned between the first electrode and the second electrode:

providing electrical power to the corona discharge device with a high frequency power supply having an operational frequency of at least about 1,000 Hz; and introducing the radicals into the combustion gas stream upstream of or at the catalytic convertor.

59. The method according to claim 58, further comprising forming the radicals in the precombustion gas stream.

60. A method for improving the life and performance of an oxygen sensor of an engine having a combustion gas stream, which comprises a precombustion gas stream and an exhaust gas stream, wherein the oxygen sensor is positioned in the exhaust gas stream upstream of a catalytic convertor having an inlet and an outlet, the method comprising:

producing radicals in at least a portion of the combustion gas stream by generating a corona discharge therein, produced by a corona discharge device, which comprises at least one first electrode, at least one second electrode positioned a distance from the first electrode, and a dielectric material positioned between the first electrode and the second electrode;

providing electrical power to the corona discharge device with a high frequency power supply having an operational frequency of at least about 1,000 Hz; and introducing the radicals into the combustion gas stream upstream of the oxygen sensor to remove or prevent the deposition of poisoning agents onto the oxygen sensor.

61. The method according to claim 60 further comprising forming the radicals in the precombustion gas stream.

62. The method according to claim 60, further comprising forming radicals from water in at least a portion of the exhaust gas from the exhaust stream.

63. The method according to claim 62, further comprising forming the radicals in the exhaust stream at a point upstream of the oxygen sensor.

64. The method according to claim 62, further comprising diverting at least a portion of the exhaust gas from the exhaust gas stream, conveying the diverted exhaust gas to a remote radical generator, forming radicals in the exhaust gas using a corona discharge in the radical generator, and injecting the radicals into the exhaust gas stream at a point upstream of or at the oxygen sensor.

65. A compact corona discharge device for forming a corona discharge in exhaust gas in an exhaust system of an internal combustion engine to reduce at least one pollutant, the compact corona discharge device comprising:

a first end, configured for attachment to a fitting in the exhaust system to allow exhaust gas from the exhaust system to enter into and exit from the corona discharge device, a second end, configured to prevent exhaust gas from leaking from the corona discharge device, a generally cylindrical outer electrode, electrically and mechanically connected to the first end, an inner electrode, mounted concentric with, and partially surrounded by the outer electrode, and a dielectric insulator, mounted concentric with, and positioned between the inner and outer electrodes, forming an air gap between the electrodes, the dielectric insulator having a diameter that defines the corona discharge device diameter, wherein the inner electrode has a length that is greater than that of the outer electrode to provide a corona region in the air gap near the first end and a ullage volume in the air gap near the second end.

66. A method for the reduction of at least one pollutant in an exhaust gas stream containing exhaust gas formed from the combustion of fuel in an engine having a combustion gas stream, which comprises a precombustion gas stream and the exhaust gas stream, and an exhaust pipe attached to an inlet of a catalytic convertor, the method comprising:

passing the exhaust gas stream through the exhaust pipe and the catalytic convertor;

forming radicals in the combustion gas stream by generating a corona discharge in at least a portion thereof; wherein the radicals produced by the corona discharge device, which comprises at least one first electrode, at least one second electrode positioned a distance from the first electrode, and a dielectric material positioned between the first electrode and the second electrode:

providing electrical power to the corona discharge device with a high frequency power supply having an operational frequency of or at least about 1,000 Hz:

introducing the radicals into the combustion gas stream upstream of or at the catalytic convertor; and reacting the radicals or an oxidizing species with at least one pollutant in at least one of the catalytic convertor or the exhaust gas stream upstream of the catalytic convertor, wherein the oxidizing species is produced by reaction of the radicals with gaseous species in the combustion gas stream.

67. The method of claim 66, further comprising selecting a three way catalyst as the catalytic convertor.

68. An apparatus for reducing at least one pollutant in an exhaust gas stream containing exhaust gas formed from the combustion of fuel in an engine, the apparatus comprising:

a catalytic convertor, having an inlet and an outlet, wherein the catalytic convertor is positioned such that at least a portion of the exhaust gas stream from the engine passes through the catalytic convertor;

a corona discharge device for producing a corona discharge in the exhaust gas; and a high frequency power supply having an operational frequency of at least about 1,000 Hz adapted to provide electrical power to the corona discharge device, wherein the corona discharge device comprises:

a first, inner electrode, having a diameter of from about 0.1 to about 0.3 cm, a second, outer electrode, having an inner diameter of about 1 to about 2 cm and a length of about 1.5 to 3 cm, positioned a distance from the first electrode, and a dielectric material, having a thickness of from about 1 to about 3 mm positioned between the first electrode and the second electrode, and the corona discharge is positioned within at least a portion of the exhaust gas to produce radicals from gaseous species in the exhaust gas, and the radicals are introduced into the exhaust gas stream at a point upstream of or at the inlet of the catalytic convertor.

69. The method of claim 68, further comprising selecting a three way catalyst as the catalytic convertor.

70. A method for the reduction of at least one pollutant in an exhaust gas stream containing exhaust gas formed from the combustion of fuel in an engine having an exhaust pipe attached to an inlet of a catalytic convertor, the method comprising:

passing the exhaust gas stream through the exhaust pipe and the catalytic convertor;

forming radicals in at least a portion of the exhaust gas stream by generating a corona discharge therein, produced by a corona discharge device, which comprises a first electrode, a second electrode positioned a distance from the first electrode, and a dielectric material positioned between the first electrode and the second electrode;

providing electrical power to the corona discharge device with a high frequency power supply having an operational frequency of at least about 1,000 Hz;

introducing the radicals into the exhaust gas stream upstream of or at the catalytic convertor; and removing at least a portion of at least one pollutant in the exhaust gas stream by reaction of the pollutant with the radicals in a catalytic reaction that regenerates at least a portion of the radicals.

71. The method of claim 70, wherein the radicals comprises hydroxyl radical, and the pollutant comprises at least one of a hydrocarbon or carbon monoxide.

72. The method of claim 70, further comprising further reducing the amount of the at least one pollutant by reacting at least a portion of the regenerated radicals with the at least one pollutant.

73. The method of claim 70, further comprising selecting a three way catalyst as the catalytic convertor.

\* \* \* \* \*